United States Patent [19]
Ockenden

[11] Patent Number: 5,975,549
[45] Date of Patent: Nov. 2, 1999

[54] SYSTEM FOR SIMULTANEOUSLY MOUNTING A PLURALITY OF BICYCLE ACCESSORIES TO A BICYCLE FRAME

[76] Inventor: Lynn Marie Ockenden, 3709 Pillsbury Ave., Minneapolis, Minn. 55409

[21] Appl. No.: 08/790,846

[22] Filed: Jan. 30, 1997

[51] Int. Cl.[6] .................................................. B62K 27/00
[52] U.S. Cl. ........................................................ 280/240
[58] Field of Search ..................... 224/418, 419, 224/422, 424, 425, 442, 452; 280/202, 204, 228.4, 292, DIG. 6

[56] References Cited

U.S. PATENT DOCUMENTS

| | | | |
|---|---|---|---|
| 2,583,550 | 1/1952 | Dennis et al. | 224/38 |
| 3,795,354 | 3/1974 | Stippich | 224/32 |
| 3,827,613 | 8/1974 | Meyer | 224/424 |
| 4,328,915 | 5/1982 | Melton, III | 224/32 R |
| 4,342,467 | 8/1982 | Kester | 280/204 |
| 4,418,850 | 12/1983 | Jackson et al. | 224/32 A |
| 4,440,331 | 4/1984 | Schimmels | 221/31 |
| 4,577,786 | 3/1986 | Dowrick et al. | 224/32 A |
| 4,690,420 | 9/1987 | Belka | 280/301 |
| 4,883,283 | 11/1989 | Hazelett et al. | 280/204 |
| 4,928,985 | 5/1990 | Nowlin | 280/204 |
| 5,039,120 | 8/1991 | Stowe | 280/204 |
| 5,090,717 | 2/1992 | Belka | 280/304.5 |
| 5,240,266 | 8/1993 | Kelley et al. | 280/204 |
| 5,332,134 | 7/1994 | Chen | 224/39 |
| 5,410,893 | 5/1995 | Easterwood | 280/507 |
| 5,470,088 | 11/1995 | Adams | 280/204 |
| 5,470,092 | 11/1995 | Fardy | 280/202 X |

*Primary Examiner*—Robert Obertleitner
*Assistant Examiner*—Melanie Talavera
*Attorney, Agent, or Firm*—Moore & Hansen

[57] ABSTRACT

A system for simultaneously mounting a plurality of accessories such as panniers, baskets, trailer hitch and trailer, luggage carrier, wheel fender, etc. to a bicycle frame includes an upper mounting block rigidly attachable to the frame below the bicycle seat, and two lower stirrup members rigidly attachable to the frame adjacent the wheel axle on either side of the wheel. The upper mounting block has a socket for holding a tow bar and slots for mounting a luggage carrier, both of which have legs which are lockably inserted into receiving slots in the stirrup members. A key lock locks the mounting block to the bicycle frame and the accessories to the mounting block. Accessories may be locked to the carrier.

21 Claims, 6 Drawing Sheets

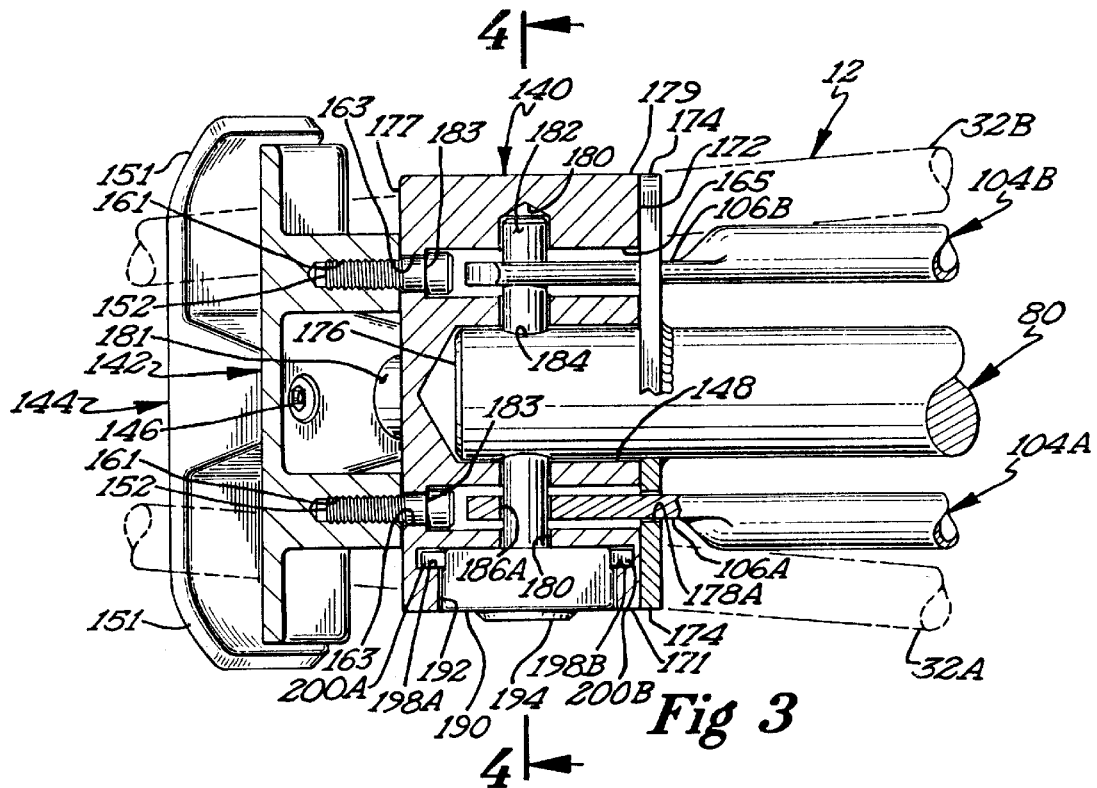
Fig 3
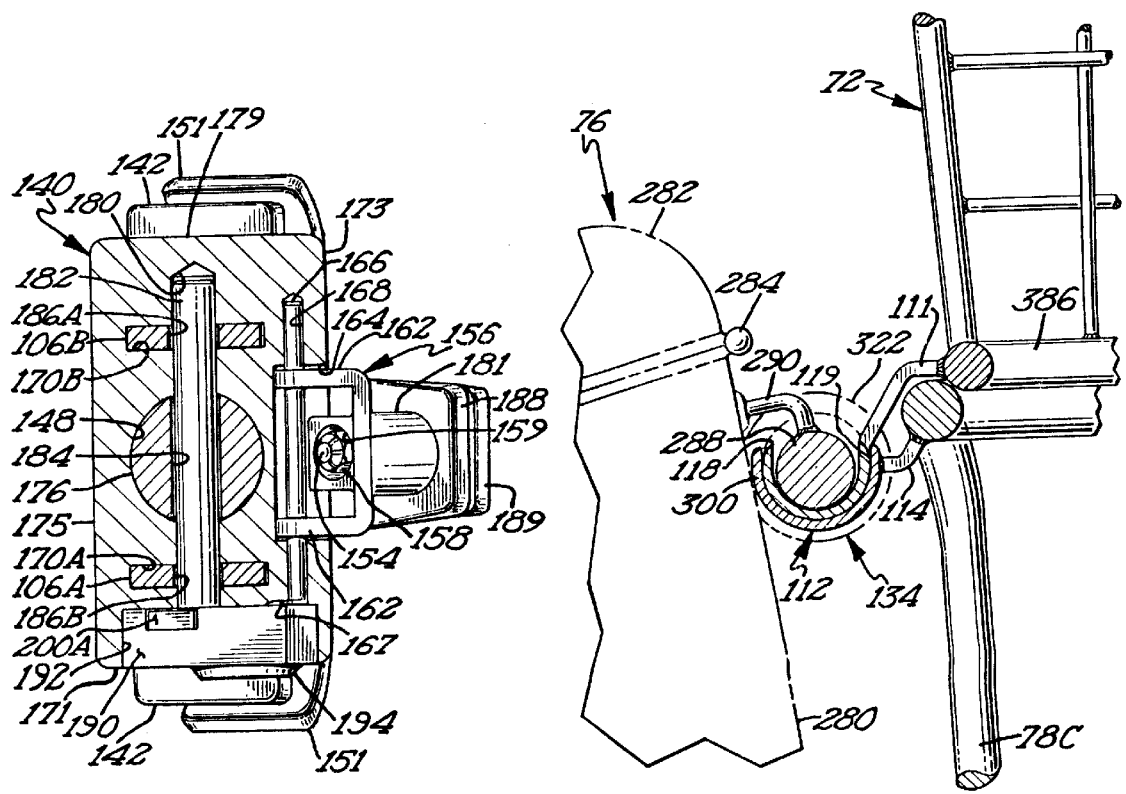
Fig 4
Fig 19

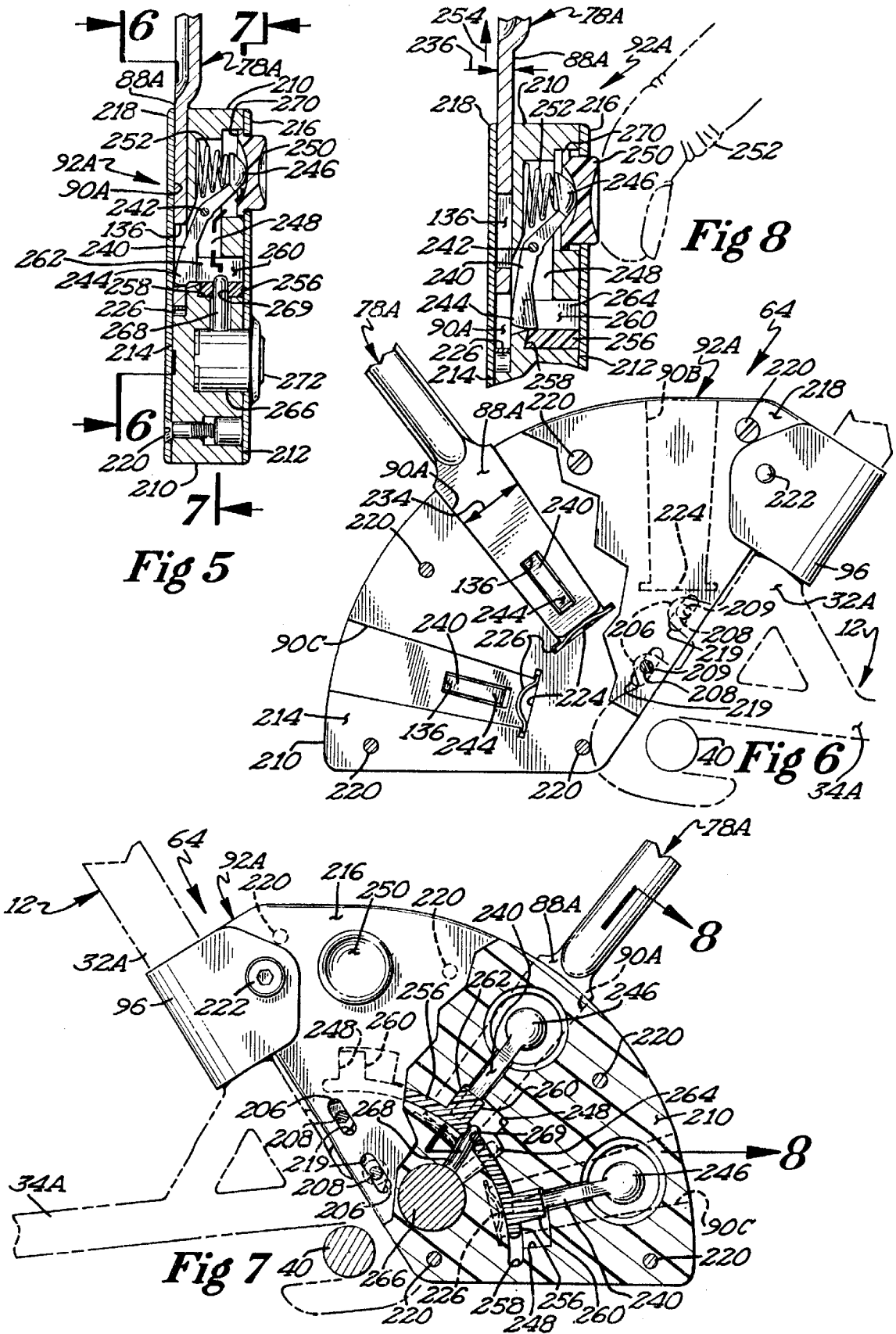

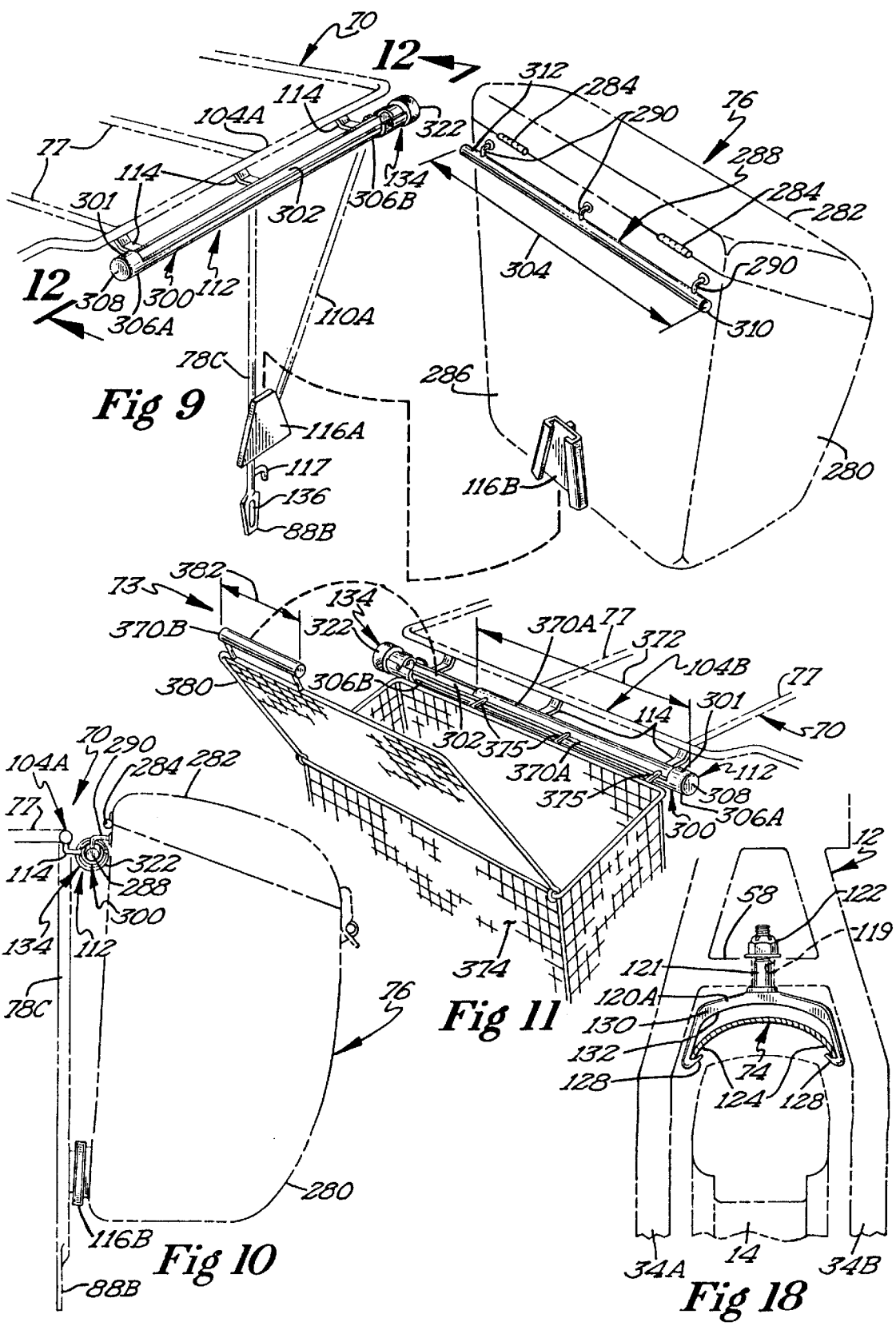

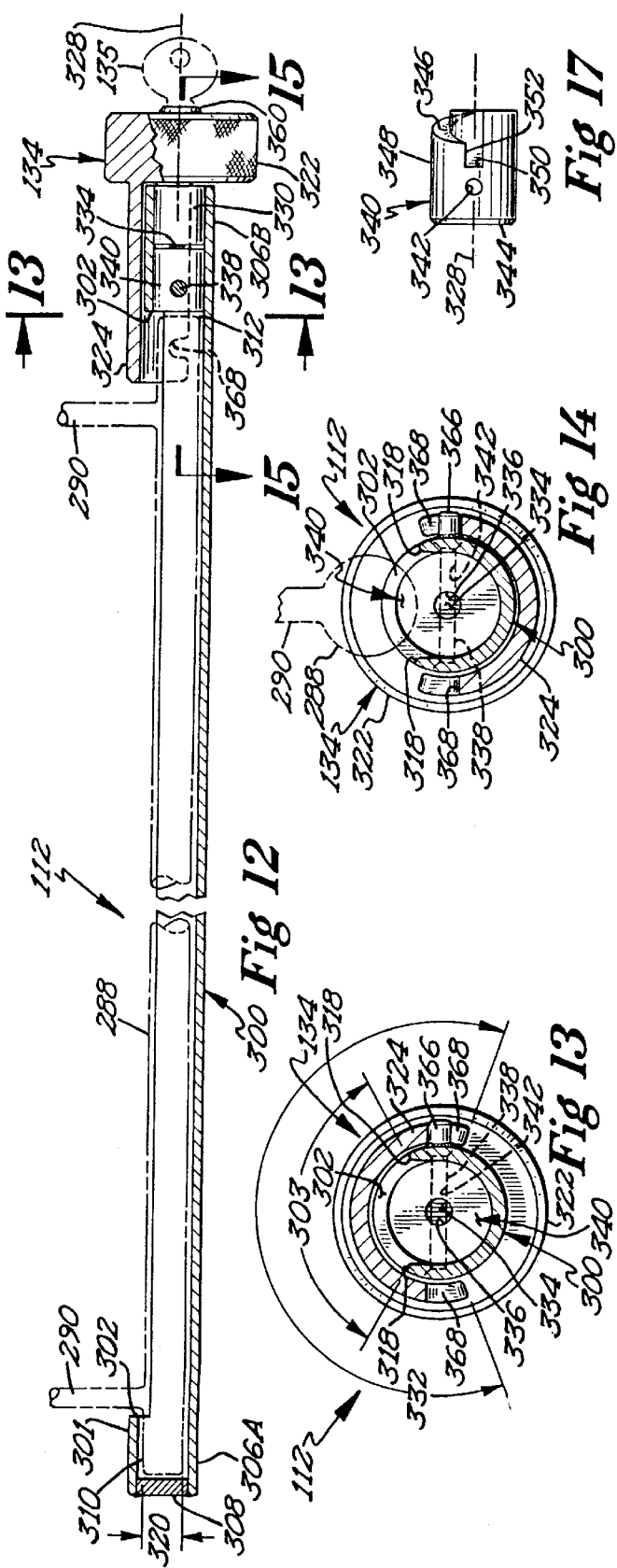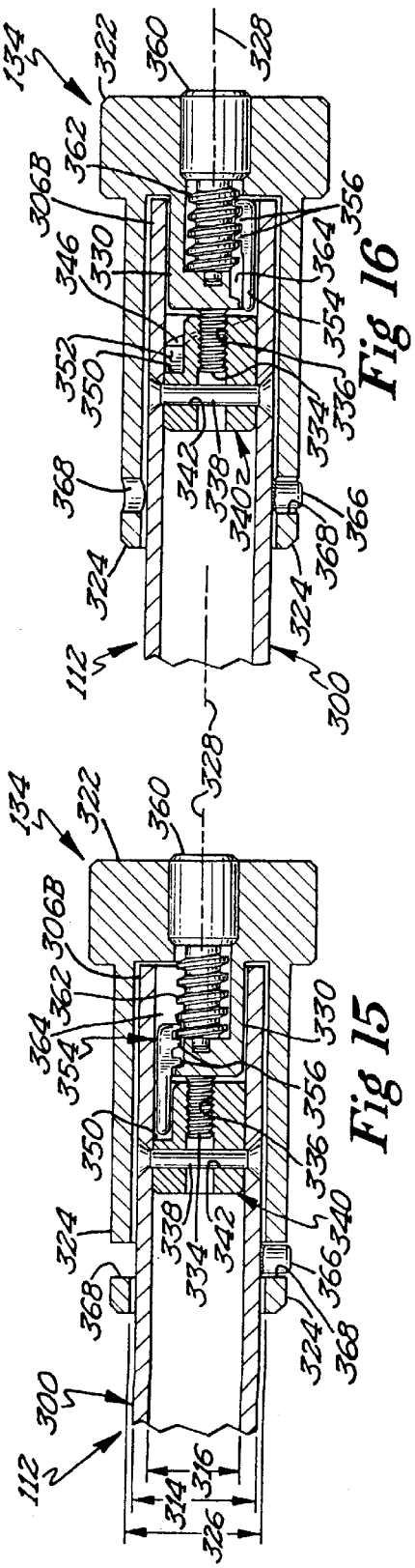

SYSTEM FOR SIMULTANEOUSLY MOUNTING A PLURALITY OF BICYCLE ACCESSORIES TO A BICYCLE FRAME

BACKGROUND OF THE INVENTION

This invention relates generally to apparatus for mounting an accessory on a bicycle. More particularly, this invention pertains to apparatus for interchangeably mounting a variety of accessories, either alone or in simultaneous combination, to a bicycle frame.

In the prior art, U.S. Pat. No. 4,883,283 of Hazelett et al. discloses a bicycle hitch for a one-wheel trailer with a horizontal tubular hitch bar.

U.S. Pat. No. 5,240,266 of Kelley et al. discloses an improvement in the Hazelett et al. hitch.

U.S. Pat. No. 4,928,985 of Nowlin shows a bicycle buggy apparatus having a tongue-and-socket pin hitch attachable to a sleeve placed on the seat support frame member.

U.S. Pat. No. 5,039,120 of Stowe teaches a bicycle towing apparatus including a horizontal member vertically pivotable about a seat support member and a pair of legs extending from the rear end of the horizontal member to the rear wheel axle.

U.S. Pat. No. 4,328,915 of Melton, III discloses apparatus for mounting a basket or other accessory to a carrier rack of a conventional bicycle.

U.S. Pat. No. 2,583,550 of Dennis et al. shows a support for attaching a wire basket to the front of a bicycle.

U.S. Pat. No. 4,577,786 of Dowrick et al. discloses a device for securing a pannier bag to a bicycle frame.

U.S. Pat. No. 4,418,850 of Jackson et al. discloses a pannier which is attachable to the rear carrier rack of a bicycle.

U.S. Pat. No. 4,440,331 of Schimmels teaches a construction of a child protective carrier mountable over a bicycle wheel.

There are many accessories which are useful to bicyclists. These include removable fenders over the front and/or rear wheels, bicycle cargo carrying racks which may be positioned over either wheel, baskets, saddlebags or panniers which are generally mounted beside or over a wheel, and even small trailers for carrying children, groceries, golf clubs or other cargo.

While all of the above-indicated accessories are known and available on the market, each accessory typically has its own mounting system by which it is attached to the bicycle. In general, the mounting system of any available accessory makes simultaneous mounting of other accessories difficult, inconvenient and often impossible. Generally, the various accessory mounts are incompatible. For example, the mounting means associated with a removable luggage rack may be connected to the bicycle frame such that a trailer hitch, saddlebags, or fender cannot be simultaneously mounted to the bicycle.

The bicycle mounting devices in the prior art have other drawbacks, among which are, non-lockability, a need for tools to mount or remove the accessory, and a general lack of versatility.

None of the references enables the simultaneous mounting of a wide variety of standard accessories to a bicycle, whereby individual accessories may be quickly and easily mounted or removed as desired.

BRIEF SUMMARY OF THE INVENTION

A universal accessory mounting system is configured to be attached to a bicycle in a substantially rigid attachment. An upper attachment assembly may be attached to the bicycle frame behind and below the seat, or optionally to a front frame member adjacent the bicycle's front wheel. A lower attachment assembly includes a pair of stirrup members which may be attached to a frame member on each side of the front and/or rear wheel adjacent a wheel axle. The stirrup members are mirror images of each other. Intermediate structures, designated herein as primary accessories, include several alternative or additive detachable beam assemblies which extend longitudinally from the upper attachment assembly, and have detachable support legs which extend from the beam assembly to be retained in stirrup members on both sides of the wheel. Not only are these intermediate structures useful as accessories, e.g. trailer hitch or luggage rack, but secondary accessories such as panniers, baskets, reflectors, lights and the like may be mounted thereon. The mounting system is attachable over either the bicycle rear wheel, the front wheel or over both wheels.

Exemplary of the wide variety of accessories which may be mounted on a bicycle with this mounting system are (1) a luggage or carrier rack, (2) side panniers, (3) a trailer hitch for pulling a trailer, e.g. golf cart, child cart, or other wheeled vehicle, (4) side baskets, and (5) a front or rear basket which mounts on the luggage rack. In addition, a wheel fender may be easily mounted and removed using this mounting system. Also, a rear light and/or reflector may be easily mounted at a variety of possible locations on the mounting system to accommodate the installed accessories.

Unlike other bicycle mounting systems, this universal multipurpose apparatus permits the simultaneous mounting of a variety of accessories. Thus, for example, a rear carrier rack, a basket, a pair of panniers, a wheel fender, a trailer hitch, and a reflector or taillight may all be simultaneously mounted with this system. Any of the secondary accessories may be quickly and easily removed independently of other accessories. The mounting system may include built-in locking assemblies which require a key to remove the mounting system and/or attached accessories from the bicycle.

Unlike other mounting systems, accessories may be mounted or removed without tools. The mounting apparatus and accessories do not interfere with the mounting or removal of a wheel from the bicycle. The light weight of the apparatus enables the bicyclist to carry heavier loads without exceeding the practical total weight carrying capacity of the bicycle.

Because of the general similarity in bicycle frame design, the mounting apparatus of this invention is applicable to nearly all bicycles presently in existence. Where differences exist, the mounting apparatus may be adapted to different bicycles using small inexpensive parts, e.g. inserts may be provided to adapt clamp members to different sizes and angular positions of frame members. Certain parts of the apparatus may be varied in shape and/or size to accommodate particular bicycle constructions.

These and other objects and advantages of the invention will be readily understood by reading the following description in conjunction with the accompanying figures of the drawings wherein like reference numerals have been applied to designate like elements throughout the several views.

BRIEF DESCRIPTION OF THE DRAWINGS

FIG. 3 is a cross-sectional top view of the upper attachment assembly of the multipurpose mounting apparatus of the invention, taken in the direction of cutting plane 3—3 of FIG. 1;

FIG. 4 is a cross-sectional rear view of the upper attachment assembly of the multipurpose mounting apparatus of the invention, taken in the direction of cutting plane 4—4 of FIG. 3;

FIG. 5 is a cross-sectional view of a lower attachment assembly of the multipurpose mounting apparatus taken in the direction of cutting plane 5—5 of FIG. 1;

FIG. 6 is a right side view, taken partially in section, of a lower attachment assembly of the multipurpose mounting apparatus of the invention, taken in the direction of cutting plane 6—6 of FIG. 5;

FIG. 7 is a partial cross-sectional left side view of a lower attachment assembly of the multipurpose mounting apparatus of the invention, taken in the direction of cutting plane 7—7 of FIG. 5;

FIG. 8 is a partial cross-sectional enlarged front view of a lower attachment assembly of the multipurpose mounting apparatus of the invention, illustrating the removal of an accessory leg therefrom, taken in the direction of cutting plane 8—8 of FIG. 7;

FIG. 9 is a front perspective, partially exploded view of a closed pannier mountable on a luggage rack embodying the invention;

FIG. 10 is a front cross-sectional view of the mounting arrangement for one style of closed pannier mounted on a luggage rack attached to a multipurpose mounting system of the invention, taken in the direction of cutting plane 10—10 of FIG. 1;

FIG. 11 is a perspective view of a basket mounted on a luggage rack attached to the multipurpose mounting system of the invention;

FIG. 12 is a cross-sectional view of a pannier/basket locking mount on a luggage rack attached to a multipurpose mounting system of the invention, taken in the direction of cutting plane 12—12 of FIG. 9;

FIG. 13 is a cross-sectional view of a locking mount of the invention in a locked position, taken in the direction of cutting plane 13—13 of FIG. 12;

FIG. 14 is a cross-sectional view of a locking mount of the invention in an unlocked position, taken in the direction of cutting plane 13—13 of FIG. 12;

FIG. 15 is a cross-sectional view of part of a locking mount of the invention in a locked position, taken in the direction of cutting plane 15—15 of FIG. 12;

FIG. 16 is a cross-sectional view of part of a locking mount of the invention in an unlocked position, taken in the direction of cutting plane 15—15 of FIG. 12;

FIG. 17 is a side view of a locking cam plug of the pannier/basket locking mount of the invention;

FIG. 18 is a cross-sectional top view of a fender guideway and retained fender attached to a bicycle in accordance with the invention, taken in the direction of cutting plane 18—18 of FIG. 1; and FIG. 19 is a partial end view of a top basket and pannier of the invention simultaneously mounted on a luggage rack embodying the invention.

DESCRIPTION OF THE PREFERRED EMBODIMENTS

Figure 1:
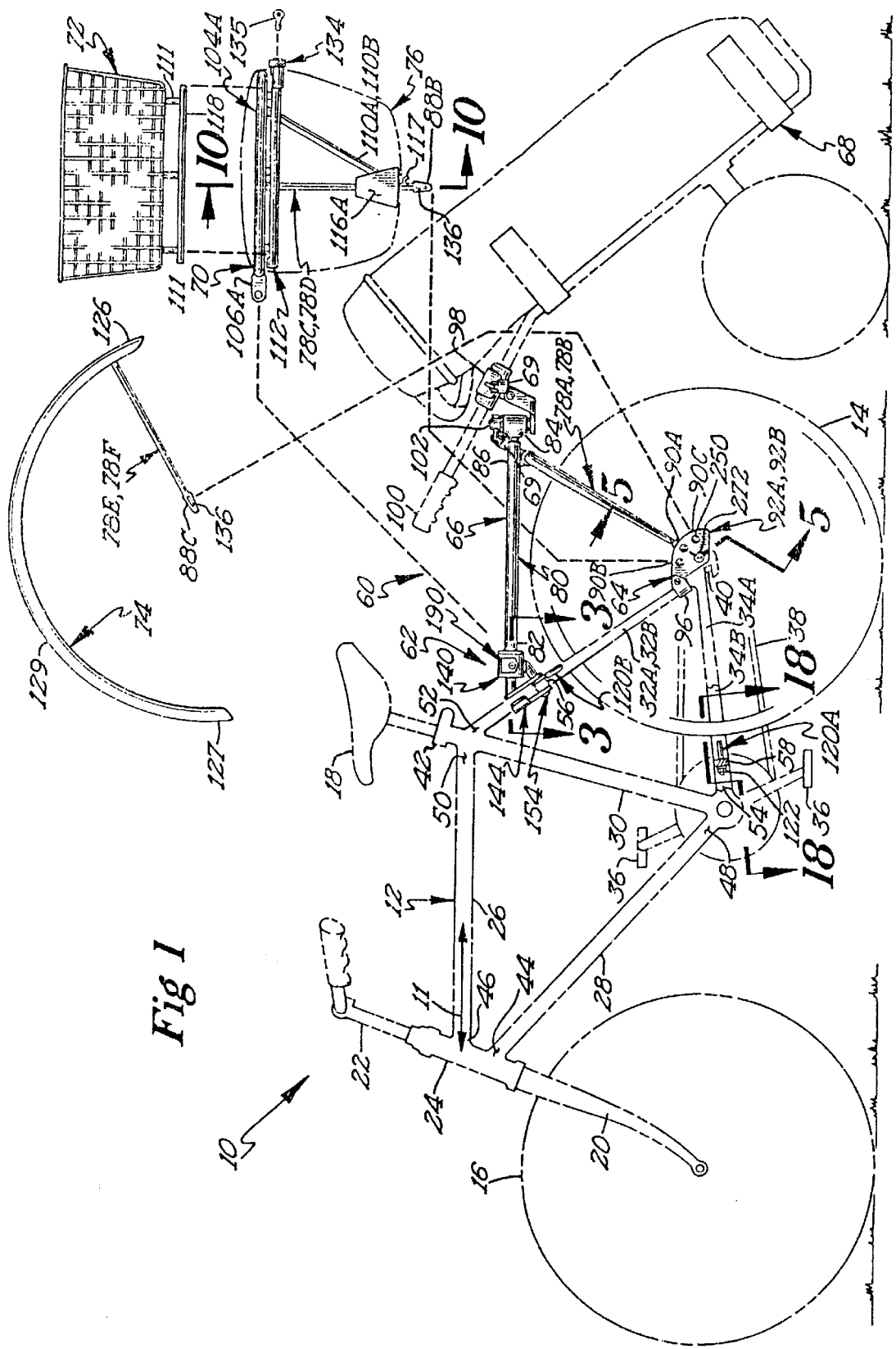
FIG. 1 is a left side view of a bicycle shown in phantom and upon which a multipurpose mounting apparatus embodying the invention is shown with multiple accessories which may be attached to the bicycle either singly or in combination.

With reference to the drawings, and particularly to FIG. 1, a conventional bicycle 10 is shown with a rigid tubular frame 12, rear wheel 14, front wheel 16, and seat 18. The frame 12 includes front fork 20 with attached steering post 22, front stem 24 through which steering post 22 passes, upper beam 26, front strut 28, center strut 30, a pair of rear struts 32A and 32B, and a pair of lower beams 34A and 34B. The rear wheel 14 is driven by foot pedals 36 typically acting through a chair 38 to a drive (not shown) with one or multiple gear ratios. One each of the rear struts 32A, 32B and lower beams 34A, 34B are positioned on each side of the rear wheel 14 and joined at or near the rear wheel axle 40. The spaced-apart lower beams 34A, 34B are typically interconnected by a cross-bar 58. A seat mount 42 is typically a telescoping extension of the center strut 30. The frame 12 is typically formed by welding the front ends 44 and 46 of the front strut 28 and upper beam 26, respectively, to the front stem 24, and the rear ends 48 and 50 of the front strut 28 and upper beam 26, respectively, to the center strut 30. The front ends 52 of the rear struts 32A, 32B and the front ends 54 of the lower beams 34A, 34B are joined to the center strut 30. The left and right rear struts 32A and 32B are typically interconnected by one or more cross-braces 56 which may be straight or arcuate (see FIG. 2).

The longitudinal axis 11 of the bicycle 10 is shown in FIG. 1 for reference purposes.

A universal multipurpose accessory mounting system 60 is depicted in FIG. 1 as having an upper attachment assembly 62 and a lower attachment assembly 64, both of which may be locked to the bicycle frame 12. The mounting system 60 is shown attached to the rear struts 32A, 32B but alternatively, may be attached to other frame members, e.g. to the steering post 22 and/or front fork 20 for mounting accessories over the front wheel 16.

Accessories which are mounted to both the upper attachment assembly 62 and the lower attachment assembly 64 by bilateral legs are denoted herein as "primary accessories" and include a hitch assembly 66 and a luggage carrier 70. Accessories which are not directly mounted to both of the upper and lower attachment assemblies 62, 64 are denoted herein as "secondary accessories". Such accessories include wheeled trailers such as a golf cart 68 as well as a top basket 72, side baskets 73, panniers/saddlebags 76, wheel fenders 74, and lights/reflectors (not shown).

As illustrated in FIG. 1, a hitch assembly 66 useful for towing various types of trailers such as a golf cart 68, is shown mounted to the upper attachment assembly 62 and lower attachment assembly 64. Other accessories such as a luggage rack or carrier 70, top basket 72 and pannier 76 which may be attached to the luggage carrier 70, and a wheel fender 74 are shown in positions for simultaneous or selective additive attachment. Each of the hitch assembly 66, carrier 70, and fender 74 have elongate legs 78 with lower ends 88 which may be mounted bilaterally, i.e. one on each side of the wheel 14, in a receiving aperture such as apertures 90A, 90B and 90C in the stirrup members 92A, 92B (described hereafter) of the lower attachment assembly 64. In describing the legs 78 of these various accessories, the legs 78 associated with the hitch will be designated as 78A and 78B, the legs associated with the luggage carrier will be identified as 78C and 78D and the fender legs as 78E and 78F, all as more specifically set out hereafter. Similarly the lower ends 88 of the legs of the various accessories are designated 88A for the hitch, 88B for the luggage rack and 88C for the fender.

The hitch assembly 66 utilizes an elongate towing bar 80 having a first end 82 which is configured to be mountable in the upper attachment assembly 62. A hitch body 84 is mounted on the second end 86 of the towing bar 80 for attachment to a trailer such as the golf cart 68. The hitch body 84 is pivotably mounted to the towing bar 80 for pivoting movement about the center, horizontal axis of the tow bar 80.

Extending downwardly and forwardly from the towing bar 80 are two elongate legs 78A, 78B whose lower ends include apertured tips 88A which are configured to fit into receiving slots 90A in the stirrup members 92A and 92B of the lower attachment assembly 64. The left and right stirrup members 92A, 92B, respectively, are mounted to the left and right rear struts 32A, 32B by individual frame mounts 96, one stirrup member on each side of the wheel 14. Preferably, legs 78A, 78B are attached to the towing bar 80 near its second end 86. The legs 78A, 78B may be pivotably mounted on towing bar 80 for accommodating a range of bicycle sizes. It may be noted that towing bar 80 is preferably formed as a tubular structure to provide high strength at minimum weight and cost.

A connecting hitch member 98 is shown clamped to the golf cart arm 100 and has a pin 102 which allows the cart 68 to swivel about a vertical axis passing through the pin 102. The hitch member 98 may also be provided with a pivot mechanism to allow pivoting of the hitch member 98 relative to the hitch body 84 about a horizonal axis perpendicular to the plane of the drawing of FIG. 1. Such a horizonal pivot axis is pictured in FIG. 1 just below and to the left of the lock 69 on hitch member 98. While the hitch body 84 and hitch member 98 have been described as using specific features allowing pivoting about three axes, it should be understood that various other universal joint configurations may be substituted so long as the connection between trailer and bicycle allows flexibility between bicycle and trailer. The hitch configuration is illustrative of the myriad of possible hitch designs and may be provided with locking means such as a small padlock 69 or other suitable lock to inhibit theft of the trailer. Of course, the hitch may be of any type which provides the desired attachment to a bicyclist's particular trailer, whether it is a golf cart, wagon, child carrier, or other type of trailer. The clamp hitch member 98 is particularly adaptable for towing a variety of trailer configurations.

As shown in FIGS. 1 and 9–11, a luggage carrier 70 is a primary accessory with the capability of supporting other secondary accessories such as top-mounted basket 72 as well as side mounted basket(s) 73 or pannier(s) 76. The carrier 70 includes a plurality of elongate members 104A and 104B joined by transverse members 77 to form a platform and having a pair of tongues 106A and 106B which may be inserted and retained in the upper attachment assembly 62 (see FIG. 2). Downwardly extending legs 78C, 78D have lower ends with apertured tips 88B which are inserted and retained in receiving slots 90B in the left and right stirrup members 92A, 92B. The carrier 70 is shown as having a pair of braces 110A and 110B, one brace extending from each side of the carrier to the corresponding leg 78C, 78D, thus enabling higher weight loads to be supported on the carrier.

Also shown in FIG. 1 is a means for attaching a pannier or saddle bag 76 on one or both sides of the carrier 70. The carrier 70 has a pair of outboard elongate locking members 112, one attached on each side of the carrier by connectors 114. A wedge bracket 116A (FIG. 9) mounted on each leg 78C, 78D or on a brace 110A or 110B provides support for a matching clamp 116B on a lower portion of the pannier(s) 76. Each outboard locking member 112 (FIG. 9) is shown with a first closed end 306A and a second end 306B with a tube lock device 134 operated with a key 135. The tube lock device 134 may be used for lockably attaching other secondary accessories such as side baskets 73, and is shown further in FIGS. 9 through 17, and 19 and discussed infra, in relationship thereto.

A top basket 72 (FIG. 1) or other container may be formed of any material such as metal screen, wood, plastic, or basket material, and may be mounted atop the carrier 70. Attached to each side of the basket 72 by downwardly extending connectors 111 is a mounting trough 118 which is lockably supportable in the corresponding outboard locking member 112 of the carrier 70. The particular construction of the mounting trough 118 will be further discussed hereafter in association with FIG. 19.

In FIGS. 1 and 18, a removable rear wheel fender 74 is shown as being attachable to the bicycle frame 12. The fender 74 has a pair of legs 78E, 78F near the fender rear end 126. The legs 78E, 78F pass to the left and right sides of the rear wheel 14. Each leg 78E, 78F has a perforated lower end 88C, which is insertable in one of two receiving slots 90C in the stirrups 92A, 92B.

Figure 2:
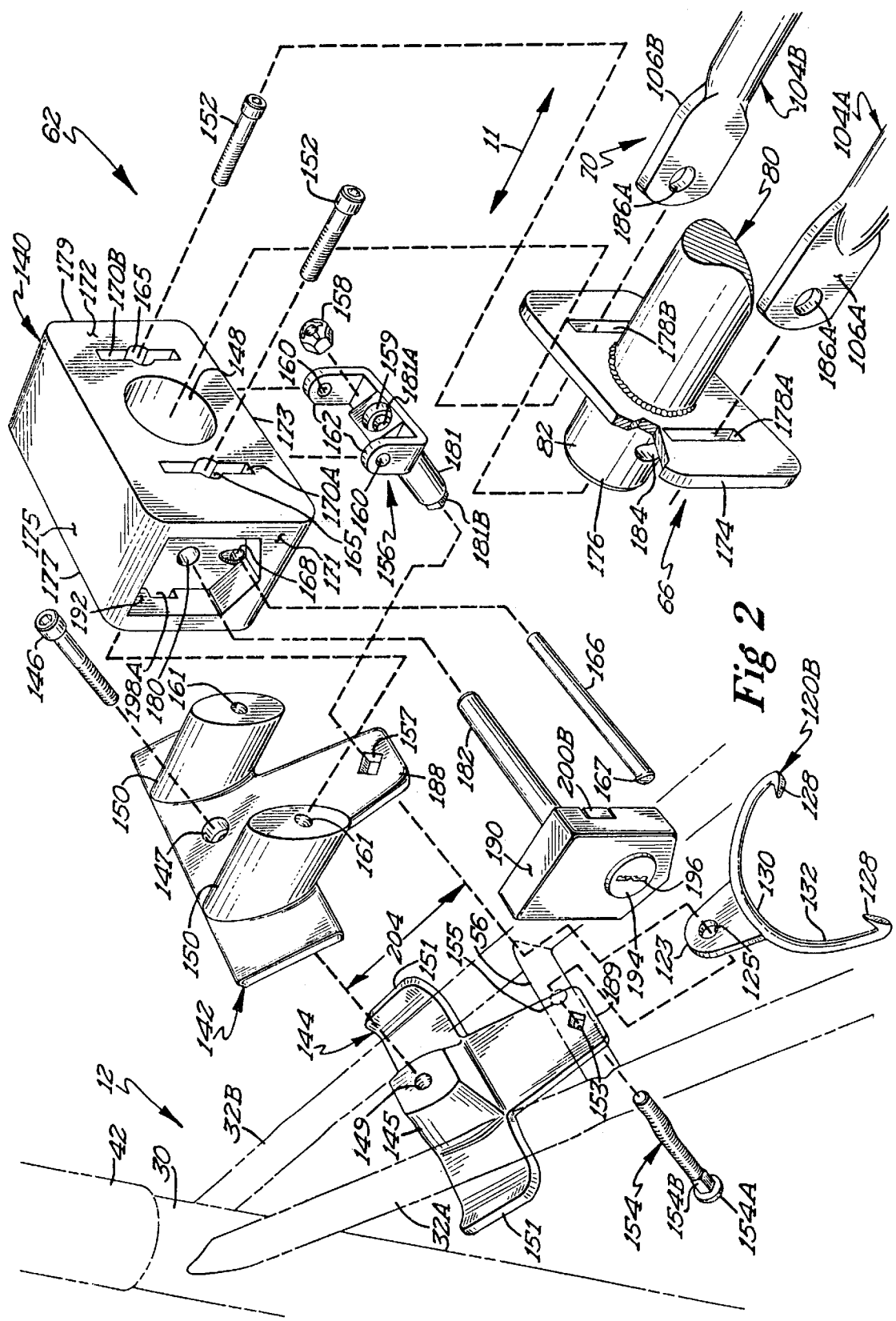
FIG. 2 is a perspective, enlarged and exploded, left side view of an upper attachment assembly of the multipurpose mounting apparatus of FIG. 1.

As shown in FIG. 18, a first fender support C-clip 120A has a threaded post 121 which passes through a hole 119 in crossbar 58. A fastener such as nut 122 is threadably engaged with post 121 to rigidly hold the C-clip 120A. A second fender support C-clip 120B is shown in FIG. 2 as having a tab 123 with a hole 125 through which a screw 154 is passed to attach the C-clip to the cross-brace 56 which connects rear struts 32A, 32EB. Thus, two fender support C-clips 120A, 120B retain the frontal portion 127 and central portion 129 of the fender 74, while the rear end 126 is supported by legs 78E, 78F, providing secure retention of the fender 74. As illustrated in FIGS. 2 and 18, C-clips 120A, 120B are guideways configured to pass around the curved configuration of fender 74 and tightly retain the fender edges 124 engaged within opposing hook ends 128 of the clip. A pliable material 130 such as a rubber or plastic surface coating having a relatively high coefficient of friction may be applied to the interior 132 (FIG. 18) of the C-clip 120A and 120B to frictionally engage and retain the fender 74 within the C-clip. The material 130 also inhibits rattling or vibration of the fender 74 while riding over rough terrain.

The fender 74 is simply mounted by threading it through the C-clip(s) 120A and 120B from the rear of the bicycle and then inserting and locking the perforated leg ends 88C into receiving slots 90C.

By mounting a primary accessory, i.e. a hitch assembly 66 and/or carrier 70 in the upper and lower attachment assemblies 62, 64 the accessory is securely and rigidly retained at three points, i.e. at the upper attachment assembly 62 and on each of the left and right sides of the rear wheel 14. Alternatively, the mounting apparatus 60 may be mounted about the front wheel 16, i.e. to the front fork 20 and/or steering post 22 and swing with the wheel as it is steered to the left or right. Of course, a hitch assembly 66 in the front of the bicycle 10 may at times be useful for towing of the bicycle from another vehicle.

Thus, panniers or side baskets, a wheel fender, a top basket, lights, reflectors and other secondary accessories including a trailer hitch may be mounted simultaneously or in various additive combinations, using the universal accessory mounting system 60, to suit the needs of the particular bicyclist.

A more complete description of the apparatus follows in a discussion of the remaining figures. Turning now to FIGS.

2, 3, and 4, an upper attachment assembly 62 is shown as including a generally solid mounting block 140 rigidly attachable to the rear struts 32A, 32B of a bicycle frame 12 using upper and lower clamp members 142, 144. The mounting block 140 is shown as being generally a rectangular hexahedron including an accessory insertion face 172 and a lock insertion face 171 which is generally disposed at a right angle with face 172. An upper face 175, lower face 173, reverse face 177 and reverse side face 179 of the mounting block 140 are also shown in the drawings. The mounting block 140 may be of any shape which permits attachment to a bicycle frame 12 and insertable attachment of accessory tongues thereto as further described herein.

The rear struts 32A, 32B of the bicycle frame 12 are clamped between the clamp members 142, 144, the clamp members being joined with a screw 146 passing through a hole 147 in the upper clamp member 142 and threaded into a tapped hole 149 in lower clamp member 144. The lower clamp member 144 is shown with outwardly and upwardly flared wings 151 to ensure a rigid attachment of the mounting block 140.

As depicted, the upper clamp member 142 has screw retaining structure shown as left and right posts 150, each of which has a central threaded hole 161. The upper clamp member 142 is attached to the mounting block 140 with screws 152, which pass entirely through apertures 165 (FIG. 2), slip through holes 163 in the reverse face 177 of the mounting block (see FIG. 3) and then thread into tapped holes 161. The holes 163 are aligned with slots 170A, 170B, shown as having enlarged portions 165 coaxial with holes 163 and extending inwardly from the accessory insertion face 172 for passage therethrough of the screws 152. Screws 152 are thus deeply recessed in mounting block 140 and have their heads bearing against shoulders 183.

The upper clamp member 142 and lower clamp member 144 have corresponding tongues 188, 189, respectively, which extend generally parallel to the rear struts 32A, 32B and therebetween. Thus, the clamp members 142, 144 may take a tricorn-like shape as shown. A hole 153 in the lower clamp tongue 189 and a corresponding hole 157 in the upper clamp tongue 188 permit attachment of the tongues to a cross-brace 56, and are disposed a distance 204 from holes 147, 149 to provide resistance to twisting of the mounting block 140. Distance 204 should be at least about 1.25 inches and preferably is at least about 1.5 to 2.5 inches.

As illustrated in FIGS. 2 and 4, the upper and lower clamp members 142, 144 are further connected to a lock yoke 156 which is lockable to the mounting block 140. A locking screw 154, which is preferably a carriage bolt, passes through hole 153 in the lower clamp member 144, through hole 155 in cross-brace 56, through hole 157 in the upper clamp member 142, through the passageway 181A in yoke column 181, and through enlarged hole 159 in lock yoke 156. The hole 153 is non-circular to match an underhead portion 154B of locking screw 154, thus preventing its rotation. The locking screw 154 has a circular head 154A and is secured to the lock yoke 156 by a threaded nut 158 which rests in enlarged hole 159. The locking screw 154 and threaded nut 158 are accessible only when the lock yoke 156 is not attached to the mounting block 140. The column 181 prevents access to the screw 154, and has a non-circular end 181B which matches and engages hole 157, preventing rotation of the yoke 156 relative to the upper clamp member 142. The lock yoke 156 has a hole 160 in each of its parallel ears 162. The ears 162 of yoke 156 are inserted into a recess 164 (see FIG. 4) in the mounting block 140 and locked therein by a pin 166 passing through a transverse aperture 168 in the mounting block 140 and through holes 160 of the yoke 156. The pin 166 is shown in FIGS. 2 and 4 with a head 167 to allow finger access for easy removal of the pin, thus releasing the lock yoke 156 from the mounting block 140. Unauthorized access to the pin 166 is prevented by insertion of a lockable lock plate 190 over the pin's head.

Thus, as illustrated, the mounting block 140 is attached to the bicycle frame 12 with a multiple-point mount which resists movement and unauthorized removal of the mounting block.

While the mounting block 140 has been described as being attached to the bicycle frame by means of a specific clamping device, it should be understood that other means of attachment may be substituted, and any attachment means which securely attaches the block 140 to the bicycle frame below and rearward of the seat may be substituted and is within the purview of the invention.

Attachment of the mounting block 140 to the bicycle 10 may be enhanced by including integral threaded bosses, not shown, incorporated in the bicycle frame 12 by the bicycle frame manufacturer.

When the mounting block 140 is mounted over the rear wheel 14, the accessory insertion face 172 faces rearwardly. The accessory insertion face 172 includes a generally horizontal central socket 148 which is generally parallel to the longitudinal axis 11 of the bicycle 10. The first end 82 of a towing bar 80 is mateably receivable and lockable in the central socket 148. In addition, two lateral slots 170A, 170B extend into the mounting block 140 parallel to socket 148. The first end 82 of the towing bar 80 includes a cylindrical tongue 176 and a face plate 174 securely affixed thereto. The face plate 174 has a pair of vertical slots 178A, 178B therein which are in alignment with, i.e. overlie the slots 170A, 170B of the mounting block 140 when the tongue 176 of towing bar 80 is mounted in block 140.

The tongues 106A, 106B (FIG. 1) of the elongate members 104 of luggage carrier 70 are retainably insertable in slots 178A, 178B, respectively in the face plate 174, and/or into the slots 170A, 170B, respectively, in the mounting block 140. A transverse pin aperture 180 extends horizontally through the mounting block 140, intersecting slots 170A, 170B, respectively, and central socket 148 so as to permit a horizontal pin 182 to be inserted in the aperture 180 and pass through hole 184 in the tow bar tongue 176 and through holes 186A, 186B in the carrier tongues 106A, 106B. The pin 182 serves as a locking mechanism for the towing bar 80 and/or the elongate members 104A and 104B of carrier 70. The locking pin 182 and pin 166 may be simply retained in place by friction, or by any other means which holds the pins within their respective transverse pin apertures 180, 168.

In one embodiment shown in the figures, a lock plate 190 is lockable within a cavity 192 in the lock insertion face 171 of mounting block 140 to prevent unauthorized access to the locking pins 182 and 166 without a key 135. Such a lock plate 190 is intended to prevent theft of the upper attachment assembly 62 and accessories attached thereto. As shown, a rotatable lock cylinder 194 with keyhole 196 is mounted in lock plate 190, which is configured for insertion into cavity 192 and locking therein. The cavity 192 includes opposed keeper spaces 198A, 198B for receiving and retaining lock bars 200A, 200B which are projected outwardly from the lock plate 190 by rotation of key 135. The locking pin 182 is shown as being attached to the lock plate 190 such that key activation and removal of the lock plate results in withdrawal of pin 182 and unlocking of towing bar tongue 176 and carrier tongues 106A and 106B whereby they may be withdrawn from the mounting block 140. When locking pin 182 is fully inserted in pin aperture 180, the pin obstructs apertures 165, thus preventing unauthorized access to and removal of screws 152, which join the mounting block 140 to the upper clamp member 142. The pin 166 may be removed by the operator inserting a finger nail under the head 167 and pulling the pin out, releasing the lock yoke 156. The mounting block 140 may be then removed from the bicycle frame 12 by removing screws 152. Thus, a single keylock controls the locking of (a) the mounting block 140 to the bicycle 10, (b) the towing bar 80 to the mounting block 140, and (c) the carrier 70 to the mounting block, making theft of the upper attachment assembly 62 and attached accessories difficult and time consuming.

If a key lock is not desired, a hand manipulable lever, button or other device may be used to release each of locking pins 166, 182. For example, a rotatable lever may be used in place of the lock cylinder 194 to move the lock bars 200A and 200B.

It is noted that in the illustrated configuration of the mounting block 140, insertion and locking of the carrier tongues 106A and 106B into the mounting block further discourages unauthorized access to screws 152 which connect the upper clamp member 142 to the mounting block.

In this invention, it is important that the towing bar 80 and carrier 70 may be individually or simultaneously mounted to the mounting block 140. A trailer may be attached to the towing bar 80. Secondary accessories are lockably attachable to the carrier 70.

The mounting block 140 may be formed by molding and/or machining of a strong plastic or metal, preferably a high strength dimensionally stable plastic or a lightweight metal such as aluminum or magnesium. It is also possible to form the mounting block 140 of plate metal pieces which are welded or otherwise joined to form interior channels for insertion of the yoke 156, carrier tongues 106A and 106B, towing bar tongue 176, locking pin 166, lock plate 190 with pin 182, and screws 152.

As shown in FIGS. 5, 6, 7 and 8, the lower attachment assembly 64 comprises a pair of stirrup members 92A, 92B, one on each side of a bicycle wheel, in this instance a rear wheel 14 (see FIG. 1). Only the left stirrup member 92A is shown in each of FIGS. 5–8, the right stirrup member 92B being a mirror image of left stirrup member 92A. Together, the stirrup members 92A, 92B provide lower mounting sites for the bilateral legs of the bicycle accessories.

Each stirrup member 92A, 92B is formed of a central body 210 with generally planar front and rear surfaces 212, 214, respectively. Attached to the front surface 212 and the rear surface 214, as with screws 220, are a front plate 216 and a rear plate 218, respectively. Each stirrup member 92A, 92B is positioned so that the front plate 216 is facing outward from the bicycle wheel for readily inserting or removing the lower apertured tips 88A, 88B and 88C of the accessory legs in the receiving slots 90A, 90B and 90C, respectively, of the stirrup members.

The stirrup members 92A, 92B are rigidly attached to rear struts 32A, 32B as shown, or to lower beams 34A, 34B, respectively. One possible attachment is illustrated, i.e. the stirrup members 92A, 92B are attached by screws 208 passed through screw holes 219 through the stirrup member 92A or 92B and through screw holes 209 in tabs 206 typically found on modern bicycles 10. As shown, the frame mount 96 is a strong strap-like member tightly passed about a rear strut 32A or 32B and firmly attached to the stirrup member by a screw 222. Frame mount 96 may be an extension of either the front plate 216 or rear plate 218 of each stirrup member 92A, 92B. In the drawings, the frame mount 96 is shown as a separate U-shaped "strap" enclosing the rear strut 32A and attached by screw 222 to each side of the stirrup member 92A. The frame mount 96 may be formed of a metal such as aluminum or a strong plastic material.

Thus, the mounting of an accessory 66, 70 or 74 in the lower attachment assembly 64 and to at least one other point on the bicycle frame 12 provides a rigid mount of the accessory, preventing significant movement forwardly, rearwardly, vertically, and laterally.

As rendered in the drawings of FIGS. 5–8, the central body 210 of a stirrup member 92A has a plurality, e.g. three receiving slots 90A, 90B and 90C which are angularly spaced in a coplanar arrangement for accepting and retaining therein the apertured tips of the accessory legs 78A, 78C and 78E. Thus, in the figures, generally vertical receiving slot 90B accepts the tip 88B of carrier leg 78C. Slot 90A accepts the tip 88A of the hitch assembly leg 78A at an angle of about 50 degrees from the horizontal. Slot 90C accepts the tip 88C of a fender leg 78E at an angle of about 15 degrees from the horizontal. However, the slots 90A, 90B, and 90C may be at any appropriate angle, and the slots may even be parallel, depending upon the leg orientation. If desired, a tip may be made non-parallel to the leg of which it is a part, but this generally results in a leg having reduced support capability. The slots and corresponding tips may be graduated in width 234 (FIG. 6), and/or in thickness 236 (FIG. 8) to enable easy insertion and removal. In the embodiment shown, the receiving slots 90A, 90B, 90C comprise elongated recesses on the rear surface 214 of the central body 210, and each utilizes the rear plate 218 as one surface of the slot. Although the stirrup members are here illustrated as having three receiving slots in each member, it should be understood that a greater or lesser number of such slots could be formed in each stirrup member, and such variations are within the scope of the invention.

Each of the internal seats 224 (FIG. 6) of the receiving slots 90A, 90B and 90C is configured to retain a short-stroke spring 226 whose purpose will be explained, infra. Each of the leg tips 88A, 88B, 88C has an aperture 136 therethrough by which the tip is retained and/or locked in its respective receiving slot 90A, 90B or 90C.

In an alternate arrangement, a short-stroke spring may be attached to each leg tip 88A, 88B, 88C and the spring 226 eliminated from the receiving slots 90A, 90B, 90C.

The general apparatus and operating principles for retaining and locking the leg tips in each of the receiving slots being the same, the apparatus relating to retaining leg tip 88A in receiving slot 90A will be described as representative of a preferred embodiment of the stirrups of the invention.

FIG. 5 shows leg tip 88A fully inserted into one of the receiving slots 90A, being forced downwardly against and depressing spring 226. A lever 240 is rotatable about axis 242 in a recess 248 within the central body 210. The recess 248 laterally intersects the receiving slot 90A such that a first end 244 of the lever 240 may be moved to a position within leg tip aperture 136 and thus prevent removal of the leg tip 88A. As shown in FIG. 8, the second end 246 of the lever 240 is movable inwardly by actuation of a pushbutton 250 by the operator's finger 252 to retract the lever's first end 244 from the aperture 136. The leg tip 88A may then be slid outwardly, upwardly in direction 254 from the receiving slot 90A. The pushbutton 250 and lever 240 are biased by a spring 252 to maintain the lever in the locking position shown in FIG. 5 except when pushbutton 250 is pushed inward to rotate the lever. The short stroke leaf spring 226 in the internal seat 224 of the receiving slot 90A biases the leg tip 88A upwardly so that when the pushbutton 250 is depressed, the tip 88A is ejected far enough in direction 254 by spring 226 to prevent the lever from reentering the leg tip aperture 136. Each pushbutton 250 is shown with an inner flange 270 which engages the inside of front plate 216, retaining the pushbutton in engagement with the second end 246 of lever 240.

Locking apparatus is provided for simultaneously locking the first ends 244 of all levers 240 within the apertures 136 of the legs to prevent unauthorized removal of the legs from the stirrup members 92A and 92B. As shown in FIG. 7, an arcuate runner strip 256 is reversibly slidable in an arcuate channel 258 within the central body 210. When in locking position 262, outwardly extending blocking protrusions 260 are positioned along the strip 256, selectively preventing any of the ends 244 of the levers from being retracted from the leg apertures 136. When the strip 256 is moved to its unlocked position 264 (FIGS. 7 and 8), the protrusions 260 of the strip 256 do not restrict lever movement, and any or all of the leg tips may be removed from the stirrup member 92A by actuating the buttons 250 to swing the levers 240, as shown in FIGS. 7 and 8. The distance through which the strip 256 slides along channel 25 is small, i.e. only enough to move between locked and unlocked positions allowing blocking and free movement, respectively of the levers 240. The strip 256 is shown as being movable by a rotatable shaft 266 having a radially extending pin 268 which engages an aperture 269 in strip 256 and moves the strip 256.

In an alternate arrangement, the shaft 266 may be replaced by a rotatable pinion gear which engages a rack on strip 256 and allows sliding of the strip by rotation of the pinion. Shaft 266 may also include a lock cylinder 272 (FIG. 5) which requires a key 135 to rotate shaft 266 and lock and unlock the leg tips relative to the stirrup members.

The runner strip 256 is seen to be readily formed of plastic, metal or other material which is relatively non-compressible under the finger pressures used on the push-buttons 250. The runner 256 must readily slide reversibly within the arcuate channel 258.

It is reiterated that the left stirrup member 92A and right stirrup members 92B are preferably mirror images of each other. Identical stirrup members may be used on both sides of the wheel 14, but one of the stirrup members will then have its shaft 266 and pushbuttons 250 facing the bicycle wheel. The drive chain gears and closely spaced spokes of the bicycle wheel may interfere with operation of the cylinder 272 on shaft 266, and/or pushbutton manipulation. Thus, it is preferred to have the keyholes and pushbuttons on the exterior sides of the stirrup members for easy access and manipulation.

While the stirrup members 92A and 92B have been illustrated as being attached to the bicycle struts by screws and straps other means of attachment may be substituted and are within the scope of the invention. For example, the rear strut area of the bicycle frame could be manufactured with a plate or other mounting surface fixed to a strut 32A or 32B, to a beam 34A or 34B or connected between a strut and beam. The plate would be configured to receive and support a stirrup member, and the stirrup member could be attached to the plate by crews or in any other known manner. Alternatively, such plate could be configured to serve as the rear plate 218 of the stirrup member, and the remainder of the stirrup member could then be screwed or riveted to the plate. If desired non-removable screws could be utilized to deter unauthorized removal of the stirrup member from the bicycle frame.

FIGS. 9 and 10 illustrate the mounting of a pannier or saddlebag 76 to the side of a luggage carrier 70 of the invention. The luggage carrier 70 is shown as being formed of metal rod material and has elongate left and right members 104A and 104B. Extending downwardly from left elongate member 104A are a left leg 78C and a left brace 110A which is joined at its lower end to the leg 78C. An apertured tip 88B on the lower end of the left leg 78C is adapted to be inserted into and be supported by left stirrup member 92A of lower attachment assembly 64. A right leg 78D and a right brace 110B, (FIG. 1), are mirror images of the left leg 78C and brace 110A, which extend downwardly from right member 104B to right stirrup member 92B. Thus, the luggage carrier 70 is supported on the left and right sides by stirrup members 92A, 92B, respectively.

An upwardly narrowing wedge bracket 116A is shown attached to the left leg 78C and/or brace 110A, for supporting an accessory such as a pannier or saddlebag 76.

As best seen in FIG. 9, a downwardly extending hook 117 is carried by the lower legs 78C and 78D to provide a convenient attachment point for known saddlebags and panniers requiring such a hook for their attachment.

A preferred embodiment of the pannier or saddlebag 76 is shown as having a hard shell 280 and a cover 282 attached by hinges 284. Attached to the rear panel 286 is a wedge clamp 116B into which wedge bracket 116A may be inserted to support the pannier 76.

Referring now to FIG. 9, an elongated mounting member 288 is attached to the rear panel 286 of pannier 76 with posts 290. Mounting member 288 may comprise a straight rod or cylinder formed of high strength material such as e.g. aluminum alloy or reinforced plastic. The posts 290 extend upwardly from member 288 and are thus attached to the mounting member 288 to permit the member to be inserted into a cylindrical locking member 112 attached to luggage carrier 70 by arms 114.

The construction and operation of the locking member 112 are illustrated in FIGS. 12–17. In the embodiment shown, the locking member 112 comprises a cylindrical lock tube 300 having a cutaway portion 302 (FIG. 14) which is sufficiently wide to permit the mounting member 288 to be inserted or nested in the lock tube. The cutaway portion 302 is shorter than the length 304 (FIG. 9)of is the mounting member 288. As best seen in FIG. 12, a portion of both ends 306A, 306B of the lock tube 300 are not cut away, but are full round. A mounting member 288 may be placed within the lock tube 300 by first inserting one end 310 (FIG. 12) of the mounting member into end 306A and then inserting the remainder of the mounting member in the tube. An end closure 308 in first end 306A prevents axial movement of the mounting member 288 therein. A tube lock device 134 is attached to the opposite end 306B of the lock tube 300. The tube lock device 134 is rotatable between an open and a closed position, and may be locked. In the closed position, the tube lock device 134 encircles and encloses end 312 of the mounting member 288 to prevent its removal from the lock tube 300.

The cutaway open faced portion 302 of the lock tube 300 generally comprises up to about one-half of the lock tube outside circumference. As shown in FIG. 13, the cutaway portion spans an angle 303 of about 150 degrees, and the inner edges 318 of the lock tube 300 may be reduced to enable the mounting member 288 to be snugly inserted therein. Preferably, the lock tube inside diameter 316 (FIG. 15) is not greater than the mounting member outside diameter 320 (FIG. 12) by more than about 10–15 percent.

The tube lock device 134 has a knob portion 322 and a partial tubular extension 324 with an inside diameter 326 (FIG. 15) slightly greater than the outside diameter 314 of the lock tube 300. As illustrated in FIG. 13, the partial tubular extension 324 has a circumference 332 extending through about 220 degrees, permitting passage of the mounting member 288 through the remaining 140 degrees when the extension 324 is in the open position, as in FIG. 14. The particular angular circumference 332 may be any value which will alternatively provide a locking position and an open position.

Referring now to FIGS. 12, 15 and 16, a cylindrical stud 330 extends from the knob portion 322 of the lock device 134 into the end 306B of the lock tube 300, and may be rotated therein. Extending axially from the stud 330 is a threaded stud end 334 having a shallow thread pitch. This stud end 334 is screwed into a threaded hole 336 in a plug 340 which is fixed within the lock tube 300 by a rivet 338 passing through the lock tube and a hole 342 in the plug. As shown in FIG. 17, the plug 340 has an end surface 344 against which a mounting member 288 is abutted when inserted into the lock tube 300. In addition, a cam ramp 346 extends about a circumferential portion 348, typically about 75 to 150 degrees, and terminates in a drop-in slot 350 with an end stop surface 352 for receiving a locking bolt 354 (FIG. 16) and preventing rotation of the tube lock device 134 relative to the lock tube 300.

A keylock cylinder 360 is connected to a worm gear 362 in the stud 330, permitting rotation of the worm gear with a key 135. A slot 364 in the stud 330 is provided for movement of a locking bolt 354 between a locked position within the stationary plug 340 (shown in FIG. 15), and an open position (FIG. 16) wholly within the slot 364. The locking bolt 354 has a tooth or teeth 356 by which the bolt may be moved parallel axis 328 by rotation of the worm gear 362, as motivated by rotating key 135 in the cylinder 360. FIG. 15 shows the locking bolt 354 in a locked position, and FIG. 16 shows the bolt 354 in an open position enabling rotation of the knob portion 322 about the cylindrical lock tube 300.

As shown in FIGS. 15 and 16, a stop pin 366 mounted on the lock tube 300 intersects the tubular extension 324 during its rotation about the lock tube. The stop pin 366 limits rotation of the tube lock device 134 to an angle of about 360 degrees minus angle 332, (FIG. 13), or typically about 140 degrees. In practice, however, this rotational angle is increased by use of slots or indent(s) 368 (FIG. 12) in the partial tubular extension 324, enabling the tube lock device 134 to be rotated about 180 degrees. The stop pin 366 passes into the indent 368 to increase the available rotation. The slots or indents 368 may be angled slightly to accommodate the axial movement of the tube lock device 134 as the stud end 334 is rotated in the threaded hole 336 in stationary plug 340.

It should be noted that while the cam ramp 346 on the plug 340 eases the locking process, it is not needed so long as the drop-in slot 350 in the plug will accommodate the bolt 354 (see FIG. 17).

Thus, with the locking bolt 354 in a retracted position (FIG. 16), the knob portion 322 may be rotated to rotate the partial tubular extension 324 of the lock device 134 about the lock tube axis 328 between a closed position shown in FIG. 13 where cover 324 overlies the mounting member 288 (FIG. 12), and an open position shown in FIG. 14 where the mounting member 288 may be withdrawn from the tube 300. Using a key, the tube lock device 134 may be locked in the closed position to prevent unauthorized removal of one or more accessories mounted therein.

In another embodiment shown in FIG. 11, lockable container 73, here shown as a side basket, has a two-part mounting member made up of portions 370A and 370B. A first mounting member portion 370A of abbreviated length 372 is attached to the basket body 374 by connectors 375 and is shown inserted into the lock tube 300 of outboard locking member 112. The second mounting member portion 370B is also abbreviated in length 382 and is attached to the cover 380 of the container 73. Mounting member portion 370A and portion 370B may be formed of rod or tubular material, and together form the mounting member which is inserted into the locking member 112 for lockable support and retention. The two-part mounting member may be retained and locked between the first end 306A of the lock tube 300 and the tube lock device 134. The tube lock device 134 is as already described, and restrains the second mounting member portion 370B in the lock tube 300. Thus, the container cover 380 may be locked in a closed position simultaneously with the locking of the container 73 to the carrier 70. In this embodiment, it is evident that the first mounting member portion 370A of the side basket 73 is fully supported by the lock tube 300 even when the cover 380 with second mounting member 370B is lifted out of the lock tube. The outer end of the portion 370A is trapped within lock tube 300 by tube portion 301. As is shown in FIG. 19, the side basket 73 and a top basket 72 may be simultaneously mounted to the carrier 70.

In a second unillustrated variation of a lockable container similar to the container 73, such container bottom 374 would be provided with an elongated first rod portion much like the rod portion 370A (FIG. 11) wherein the rod portion would have a length equal to the length of rod portions 370A plus 370B, and this first rod portion would have a semicircular cross section. Such a first rod portion could be cast, molded, or extruded as an elongated rod having a flat upper surface and a lower semicircular surface. Such a first rod portion would fit in and fill about half the volume of the lock tube 112. The lid 380 of the container would then be provided with a second rod portion having a cross section identical to the semicircular cross section of the first rod portion just described, but wherein the semicircular surface faces upward and the flat surface confronts the flat surface of the first rod portion. Such first and second rod portions would be parallel to one another. The second rod portion may have its length slightly shorter than the first rod portion it confronts and would be shortened at the end which enters the tube lock adjacent tube end 308 so that the second rod portion may be more easily fitted into the end portion 306A of the tube. If desired, the semicircular first and second rod portions need not be formed of solid rod material, and can instead consist of the upper and lower halves of a horizontal hollow rod. While it is preferred that these first and second rod portions have an overall circular outer configuration when they confront each other in the lock tube, the first and second rod portions could be defined by simple flat or other cross section configuration members which can fit within the lock tube and be lockable retained therein. All such variations are within the purview of the invention. Such variations can be used with a basket like that shown in FIG. 11 or with solid sided and lidded panniers.

Turning now to FIG. 19, another feature of the invention is shown. A carrier 70 is shown with leg 78C. An outboard locking member 112 is shown attached to the carrier 70 by connectors 114. As already described, the cylindrical lock tube 300 of outboard locking member 112 is formed of a cutaway tube having a semi-circular cross-section.

Attached to the top basket 72, preferably to a lower frame member 386 thereof by connectors 111, is a mounting trough 118 formed of tubular material having an outer diameter which fits closely to the inner surface 119, i.e. nests within. the cylindrical lock tube 300. In turn, the mounting members 370A and 370B of basket 73 or mounting member 288 of pannier 76 have a diameter which fits within the mounting trough 118. Thus, a mounting trough 118 and the mounting members of multiple accessories may be concentrically mounted as shown in FIG. 19 in the same locking member 112 and locked in by tube lock device 134. In addition, either may be separately mounted and locked within the tube lock device 134.

While the figures show the top basket 72 as having mounting troughs 118 and the side panniers 76 and side baskets 73 as having the overlying mounting member, the reverse may be used, i.e. the top basket 72 may be provided with the overlying mounting members and the side panniers or baskets provided with mounting troughs. Where an accessory with a mounting trough 118 and an accessory with an overlying mounting member are both to be mounted to the bicycle, the mounting trough 118 is inserted into the cylindrical lock tube 300 first, followed by insertion of the overlying mounting member 370A into the mounting trough 118. In accordance with FIGS. 12–16, the knob portion 322 is then rotated to a locking position in which the partial tubular extension 324 encloses the second ends 388 of the mounting trough 118 and mounting member 370A and 370B (see FIG. 11) or 288. A key 135 may be inserted into the keylock cylinder 360 and rotated to move the bolt 354 into the drop-in slot 350, locking the partial tubular extension 324 in the locked position. Removal of the key prevents removal of the mounting trough 118 and the mounting member from the lock tube 300. Trough 118 and the mounting member may be removed by reversing the process.

The invention provides many major benefits. A multiplicity of accessories, in a variety of combinations, may be lockable attached to the rear and/or front of a bicycle. Attachment and removal is easy and fast. Changing bicycling requirements may be quickly accommodated. The apparatus is adaptable to nearly all bicycles presently being made.

It is anticipated that various changes, variations and modifications may be made in the construction, arrangement, operation and method of construction of the invention disclosed herein without departing from the spirit and scope of the invention as defined in the following claims.

What is claimed is:

1. In combination with a bicycle, a multipurpose mounting apparatus detachably mounting a primary accessory and a secondary accessory on said bicycle, said bicycle having first and second wheels mounted on axles, a frame including steering post, front wheel fork, seat, a pair of wheel struts and drive means, said first primary accessory including a first attachment member having at least one apertured insertable end, said second primary accessory including a first attachment member with a pair of apertured, insertable ends and a pair of legs with end attachment members, said mounting apparatus comprising:

an upper attachment assembly attachable to said bicycle frame, comprising:

a mounting block with means for mounting said first primary accessory thereto, said mounting block having a socket therein for insertion and retention of said apertured insertable end of said first primary accessory therein, two spaced-apart lateral slots for receiving said pair of apertured insertable ends of said second primary accessory therein, and a transverse locking pin aperture aligned with the aperture of at least one apertured insertable end of said second primary accessory and aligned with the aperture of the said apertured insertable end of said first primary accessory; and a locking pin insertable in said transverse locking pin aperture to pass through said aligned apertures for holding said first and second primary accessories;

means for attaching said mounting block to said frame; and a lower attachment assembly attached to said bicycle frame proximate said axle of said first wheel, said lower attachment assembly comprising:

a pair of stirrup members having receiving means for supportably receiving said legs of said first primary accessory therein, said stirrup members configured to be mounted on said bicycle frame on opposite sides of said first wheel.

2. The multipurpose mounting apparatus of claim 1, wherein said lateral slots are generally parallel to said socket.

3. The multipurpose mounting apparatus of claim 1, wherein said primary accessories are simultaneously mountable in said mounting block.

4. The multipurpose mounting apparatus of claim 1, wherein said locking pin is attached to a lock plate having a key lock, said lock plate lockable in a lateral cavity in said mounting block.

5. The multipurpose mounting apparatus of claim 1 wherein said frame includes two adjacent frame members and, wherein said means for attaching the mounting block to the frame comprises:

an upper clamp member fixed to said block by screws submerged in said lateral slots, said upper clamp member having a tongue with a screw hole therethrough;

a lower clamp member configured to cooperate with said upper clamp member whereby said two adjacent frame members are clamped between said upper and lower clamp members, said lower clamp member having a tongue with a non-circular screw hole therethrough;

a yoke with spaced apart apertured ears and a downwardly extending apertured column for receiving a screw;

a first screw having a head and a non-circular collar, said screw passing through said lower clamp member and said collar lockable engaging said non-circular hole, said screw passing through said upper clamp member, through said yoke column and said yoke, and fastened with a threaded nut;

a yoke cavity in said mounting block for receiving said ears; and a second locking pin extending into said block and through said ear apertures to lock said yoke to said mounting block.

6. The multipurpose mounting apparatus of claim 5, wherein said clamp members are further clamped to each other about said frame by a second screw joining said clamp members.

7. The multipurpose mounting apparatus of claim 5, wherein placement of said yoke ears in said yoke cavity and placement of said second locking pin therethrough shields said nut on said first screw from access by a tool.

8. In combination with a bicycle, a multipurpose mounting apparatus detachably mounting a primary accessory on said bicycle, said bicycle having first and second wheels mounted on axles, a frame including steering post, front wheel fork, seat, a pair of wheel struts and drive means, said first primary accessory including a first attachment member and a pair of legs with end attachment members, said mounting apparatus comprising:

an upper attachment assembly attachable to said bicycle frame, comprising:
  a mounting block with means for mounting said first primary accessory thereto;
  means for attaching said mounting block to said frame; and
a lower attachment assembly attached to said bicycle frame proximate said axle of said first wheel, said lower attachment assembly comprising:
  a pair of stirrup members having receiving means for supportably receiving said legs of said first primary accessory therein, said stirrup members configured to be mounted on said bicycle frame on opposite sides of said first wheel;
  wherein each said stirrup member comprises:
    a front plate;
    a rear plate;
    a central body between said front and rear plates, said central body having a plurality of receiving slots for receiving said end attachment members of said primary accessory legs;
    a plurality of spring biased levers on said central body with a lever intersecting each said receiving slot to engage and retain said end attachment member of each said leg, each said lever actuatable to release said end attachment member for removal of said leg from said stirrup member;
    a channel in said central body located adjacent said levers; and
    a runner strip movable in said channel between an open position, permitting said levers to be actuated to release said legs, and a locked position, wherein actuation of said levers is prevented.

9. The multipurpose mounting apparatus of claim 8, further comprising a keylock cylinder in each said stirrup member for key actuation of said runner strip between said open position and said locked position.

10. The multipurpose mounting apparatus of claim 8, wherein each said stirrup member further includes short-stroke spring means in each said receiving slot for lifting said end attachment members of said legs in said receiving slots.

11. A quick removal towing hitch apparatus for a bicycle having a frame, rear axle, front and rear wheels, and a seat to allow towing of a vehicle, comprising:

an elongate towing bar having a first insertable end and a second end having a hitch body for attaching said towing bar to the vehicle being towed;
two spaced-apart legs attached to said towing bar, said legs extending downwardly for attachment to the bicycle frame proximate the rear axle on opposite sides of the rear wheel, each said leg having a lower insertable tip;
a pair of stirrup members, one said stirrup member attached to the bicycle frame on each side of said rear wheel proximate the rear axle, each stirrup member including a slot for receiving, supporting and retaining one of said insertable leg tips therein;
a mounting block having a socket for insertion and retention of said first insertable end therein; and
means for attaching said mounting block to the bicycle frame behind the bicycle seat.

12. The hitch apparatus of claim 11, further comprising means for locking said insertable leg tips in said stirrup members.

13. A quick removal towing hitch apparatus for a bicycle having a frame, rear axle, front and rear wheels, and a seat to allow towing of a vehicle, comprising:

an elongate towing bar having a first insertable end and a second end having a hitch body for attaching said towing bar to the vehicle being towed, said towing bar further comprising a transverse faceplate fixed to said towing bar to abut said mounting block upon insertion of said towing bar insertable end therein;
two spaced-apart legs attached to said towing bar, said legs extending downwardly for attachment to the bicycle frame proximate the rear axle on opposite sides of the rear wheel;
a mounting block having an axial socket for insertion and lockable retention of said first insertable end therein; and
means for attaching said mounting block to the bicycle frame behind the bicycle seat.

14. The hitch apparatus of claim 13, wherein said faceplate includes lateral slots and said block includes a pair of slots matching the lateral slots in said faceplate, whereby a luggage carrier may be mounted through the said slots of said faceplate into the said slots of said mounting block.

15. In combination with a bicycle, a mounting apparatus detachably mounting at least one accessory to said bicycle, said bicycle having first and second wheel mounted on axles, a frame including steering post, front wheel fork, a pair of wheel struts, seat and drive means, said accessory including a pair of legs, each leg having an end attachment member, said mounting apparatus comprising:

a lower attachment assembly attached to said bicycle frame proximate said axle of said first wheel, said lower attachment assembly including a pair of stirrup members supportably receiving said end attachment members of each said leg of said at least one accessory into a separate receiving slot therein, each said stirrup member having receiving slots for receiving end attachment members of legs from at least two accessories, said stirrup members configured to be mounted on said bicycle frame on opposite sides of said first wheel;
wherein one of said at least one accessory is a fender.

16. In combination with a bicycle, a mounting apparatus detachably mounting at least one accessory to said bicycle, said bicycle having first and second wheel mounted on axles, a frame including steering post, front wheel fork, a pair of wheel struts, seat and drive means, said accessory including a pair of legs, each leg having an end attachment member, said mounting apparatus comprising:

a lower attachment assembly attached to said bicycle frame proximate said axle of said first wheel, said lower attachment assembly including a pair of stirrup members supportably receiving said end attachment members of each said leg of said at least one accessory into a separate receiving slot therein, each said stirrup member having receiving slots for receiving end attachment members of legs from at least two accessories, said stirrup members configured to be mounted on said bicycle frame on opposite sides of said first wheel;

wherein each said stirrup member comprises:
- a front plate;
- a rear plate;
- a central body between said front and rear plates, said central body having a receiving slot for receiving a said end attachment member of a said accessory leg;
- a spring biased lever on said central body, said lever intersecting said receiving slot to engage and retain said end attachment member of said leg, said lever actuatable to release said end attachment member for removal of said leg from said stirrup member.

17. The mounting apparatus of claim 16 wherein each said stirrup member further includes:
- a channel in said central body located adjacent said lever; and
- a runner strip movable in said channel between an open position, permitting said lever to be actuated to release said leg, and a locked position, wherein actuation of said lever is prevented.

18. The mounting apparatus of claim 17, further comprising a keylock cylinder in each said stirrup member for key actuation of said runner strip between said open position and said locked position.

19. The mounting apparatus of claim 16 wherein each said stirrup member further includes short-stroke spring means in each said receiving slot for lifting said end attachment members of said legs in said receiving slots.

20. In combination with a bicycle, a mounting apparatus detachably mounting at least one accessory to said bicycle, said bicycle having first and second wheel mounted on axles, a frame including steering post, front wheel fork, a pair of wheel struts, seat and drive means, said accessory including a pair of legs, each leg having an end attachment member, said mounting apparatus comprising:
- a lower attachment assembly attached to said bicycle frame proximate said axle of said first wheel, said lower attachment assembly including a pair of stirrup members supportably receiving said end attachment members of each said leg of said at least one accessory into a separate receiving slot therein, each said stirrup member having receiving slots for receiving end attachment members of legs from at least two accessories, said stirrup members configured to be mounted on said bicycle frame on opposite sides of said first wheel;

wherein one of said at least one s,aid accessory comprises a fender;

and wherein said mounting apparatus further includes at least one C-shaped clip attached to said bicycle frame and slideably receiving said fender therein and cooperating with said stirrup means to releasably support said fender adjacent said first wheel.

21. In combination with a bicycle, an accessory mounting apparatus for detachably and simultaneously mounting first and second accessories on said bicycle, said bicycle having first and second wheels mounted on axles, a frame including steering post, front wheel fork, seat, a pair of wheel struts and drive means, each said accessory including a first attachment member and a pair of legs with end attachment members, said mounting apparatus comprising:
- an upper attachment assembly attached to said bicycle frame adjacent said seat and including a mounting block for simultaneously and individually retaining said first attachment members of said first and second accessories; and
- a lower attachment assembly attached to said bicycle frame proximate said axle of said first wheel and simultaneously and individually supportably receiving said legs of said first and second accessories therein;

wherein said mounting apparatus further includes at least one C-shaped clip attached to said bicycle frame and slideably receiving said fender therein and cooperating with said stirrup means to releasably support said fender adjacent said first wheel.

* * * * *